United States Patent
Rajangam et al.

(10) Patent No.: US 11,608,026 B2
(45) Date of Patent: Mar. 21, 2023

(54) ENERGY ABSORBING MEMBER BENEATH VEHICLE HOOD

(71) Applicants: Jayachandran Rajangam, Chennai (IN); Milind S Parab, Troy, MI (US); Sreenath Mallela, Chennai (IN); Sathiya Narayanan, Chennai (IN); Nagendra Kumar VR, Madurai (IN); Naresh Mohan, Chennai (IN)

(72) Inventors: Jayachandran Rajangam, Chennai (IN); Milind S Parab, Troy, MI (US); Sreenath Mallela, Chennai (IN); Sathiya Narayanan, Chennai (IN); Nagendra Kumar VR, Madurai (IN); Naresh Mohan, Chennai (IN)

(73) Assignee: FCA US LLC, Auburn Hills, MI (US)

( * ) Notice: Subject to any disclaimer, the term of this patent is extended or adjusted under 35 U.S.C. 154(b) by 188 days.

(21) Appl. No.: 17/117,282

(22) Filed: Dec. 10, 2020

(65) Prior Publication Data
US 2022/0185225 A1   Jun. 16, 2022

(51) Int. Cl.
*B60R 21/34* (2011.01)
*B62D 25/12* (2006.01)
*B62D 25/10* (2006.01)
*F16F 7/12* (2006.01)

(52) U.S. Cl.
CPC ........... *B60R 21/34* (2013.01); *B62D 25/105* (2013.01); *B62D 25/12* (2013.01); *F16F 7/12* (2013.01); *B60R 2021/343* (2013.01); *F16F 2224/0208* (2013.01)

(58) Field of Classification Search
CPC ... B60R 21/34; B60R 2021/343; B60R 21/38; B62D 25/105; B62D 25/12; B62D 25/081; B62D 25/082; F16F 7/12; F16F 7/123
See application file for complete search history.

(56) References Cited

U.S. PATENT DOCUMENTS

| | | | |
|---|---|---|---|
| 7,766,417 B2 | 8/2010 | Kannan et al. | |
| 8,528,964 B2 | 9/2013 | Walter et al. | |
| 8,651,552 B2 | 2/2014 | Shibutake et al. | |
| 9,150,256 B2 * | 10/2015 | Yonezawa | B62D 25/105 |
| 9,296,428 B2 | 3/2016 | Wolff et al. | |
| 9,855,914 B1 * | 1/2018 | Hammer | B60R 19/023 |
| 10,449,925 B2 * | 10/2019 | Tastekin | B62D 25/081 |
| 11,235,815 B2 * | 2/2022 | Saeki | B62D 25/084 |

* cited by examiner

*Primary Examiner* — Paul N Dickson
*Assistant Examiner* — Tiffany L Webb
(74) *Attorney, Agent, or Firm* — Ralph E. Smith

(57) ABSTRACT

In at least some implementations, an energy absorbing member for a vehicle includes an engine cover adapted to be mounted beneath a vehicle hood and to overlie at least part of an engine, and an upper member coupled to the engine cover. The upper member is cantilevered to the engine cover wherein the upper member has a base coupled to the engine cover and a free end spaced from the base, and the upper member is flexible and a first portion of the upper member spaced from the base and including the free end is movable relative to the base.

14 Claims, 4 Drawing Sheets

US 11,608,026 B2

ENERGY ABSORBING MEMBER BENEATH VEHICLE HOOD

FIELD

The present disclosure relates to an energy absorbing member provided within a front or engine compartment of a vehicle.

BACKGROUND

Vehicles include hoods that cover a front compartment of a vehicle and define part of the exterior of the vehicle. In a collision with, for example, a pedestrian, the pedestrian may impact the hood and energy is transferred between the hood and the pedestrian. While the hood may flex somewhat upon impact, the amount of flexing is limited by engagement of the hood with fixed or rigidly mounted structures in the front compartment.

SUMMARY

In at least some implementations, an energy absorbing member for a vehicle includes an engine cover adapted to be mounted beneath a vehicle hood and to overlie at least part of an engine, and an upper member coupled to the engine cover. The upper member is cantilevered to the engine cover wherein the upper member has a base coupled to the engine cover and a free end spaced from the base, and the upper member is flexible and a first portion of the upper member spaced from the base and including the free end is movable relative to the base.

In at least some implementations, the base is arranged at an angle greater than 45 degrees from the first portion. The engine cover may include a main body that is adapted to overlie at least part of the engine, and the engine cover may have a flange extending from the main body, and the base may be connected to the flange and the flange may extend from the main body toward the inner surface of the hood, and the flange may have an upper edge that is closer to the first portion than is the area at which the base is connected to the flange. In at least some implementations, the upper member includes an arcuate transition between the base and the first portion. In at least some implementations, the upper member is not coupled to the engine cover at the transition.

In at least some implementations, a reinforcing member extends along the base and is coupled to the base and the flange of the engine cover. In at least some implementations, a cowl cover is connected to the first portion of the upper member.

In at least some implementations, the first portion is formed of metal having a thickness between 0.8 mm and 1.2 mm. In at least some implementations, the upper member is defined by sheet metal, such as aluminum, having a yield strength of between 100 MPa and 140 MPa, and a tensile strength of 280 MPa to 320 MPa.

In at least some implementations, a vehicle includes a hood covering at least part of a front compartment, wherein the front compartment is separate from a passenger compartment of the vehicle and wherein the hood has an inner surface defining a boundary of the front compartment. An engine cover is mounted beneath the hood and within the front compartment, is adapted to overlie at least part of an engine within the front compartment and to be received at least partially between the engine and the passenger compartment. And an upper member is provided within the front compartment and coupled to the engine cover, the upper member being cantilevered to the engine cover wherein the upper member has a base coupled to the engine cover and a free end spaced from the engine, and the upper member has a portion received between the engine and the inner surface of the hood such that upon flexing of the hood toward the engine, the hood engages the upper member before the hood engages the engine.

In at least some implementations, the upper member has a first portion that includes the free end and that is parallel to the inner surface of the hood or within 20 degrees of parallel to the inner surface of the hood, and wherein the base is arranged at an angle greater than 45 degrees from the first portion. In at least some implementations, the engine cover includes a main body that is adapted to overlie at least part of the engine, and the engine cover has a flange extending from the main body, and the base is connected to the flange and the flange extends from the main body toward the inner surface of the hood, and the flange has an edge that is closer to the first portion than is the area at which the base is connected to the flange.

In at least some implementations, the upper member includes an arcuate transition between the base and the first portion.

In at least some implementations, a cowl cover is located at least partially between the engine and the hood, the cowl cover extends in a cross-car direction across at least a majority of the engine compartment, and wherein the cowl cover is connected to the upper member.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
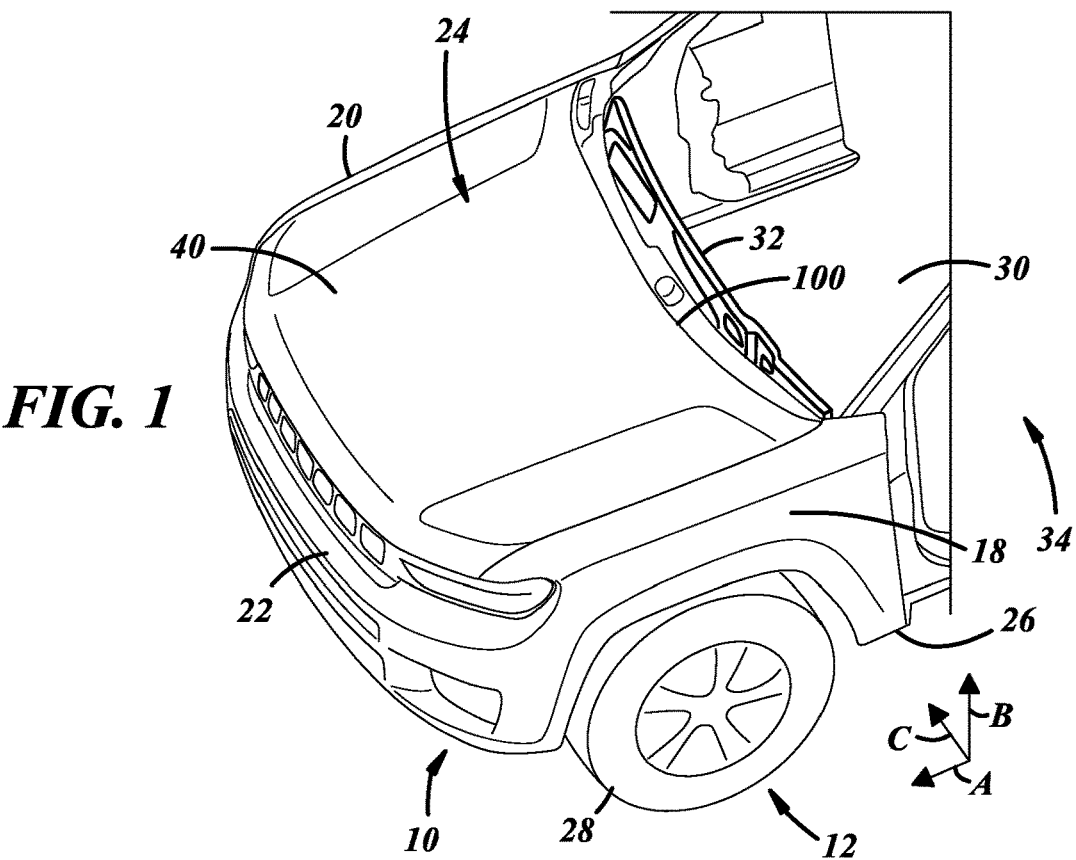
FIG. 1 is a perspective view of a front portion of a vehicle shown with a hood covering a front compartment of the vehicle.

Referring in more detail to the drawings, FIGS. 1-4 show a front portion 10 of a vehicle 12, such as a passenger vehicle like a coupe or sedan. The front portion 10 includes a front compartment 14 which may include an engine 16, other prime mover, transmission, or other components. The front compartment 14 is defined in part by exterior components like left side and right side body panels 18, 20 (sometimes called front quarter panels), a front fascia 22 and/or bumper, and a hood 24 (shown only in FIG. 1). The side body panels 18, 20 may extend in a fore-aft direction, shown by arrow A in FIG. 1, from doors of the vehicle 12 to the front fascia 22, and vertically (where the vertical direction is shown by arrow B, which is perpendicular to the fore-aft direction and a cross-car direction shown by arrow C) from the hood 24 toward a lower edge 26 of the vehicle, and the side body panels 18, 20 may span and have recesses in which part of the vehicle front wheels 28 are received. The hood 24 spans in a fore-aft direction from a windshield 30 to or toward the front fascia 22, and in a cross-car direction between the side body panels 18, 20. The vehicle 12 may include a dividing wall 32 that separates the front compartment 14 from a passenger compartment 34 including seats for passengers. The dividing wall 32 may mount and have an inward surface 36 covered by a vehicle dashboard and instrument panel and/or carpeting or other interior components.

Figure 2:
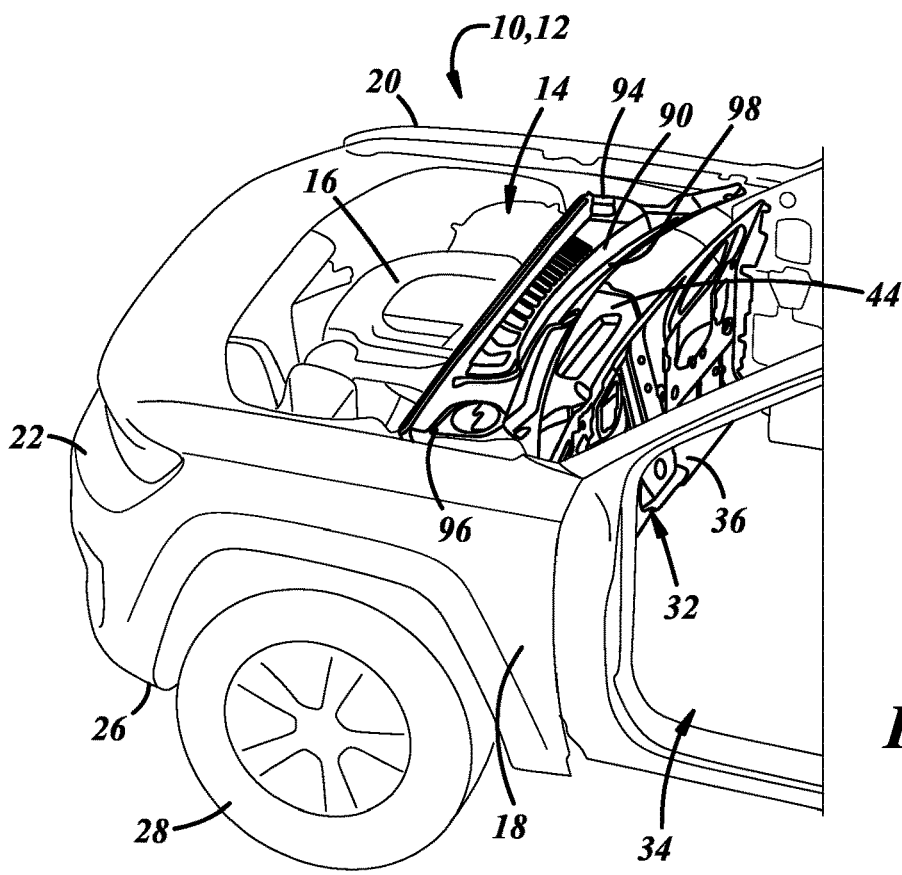
FIG. 2 is a perspective view of the front portion of the vehicle shown with the hood removed to show components within the front compartment, such as an engine and an energy absorbing member.
Figure 3:
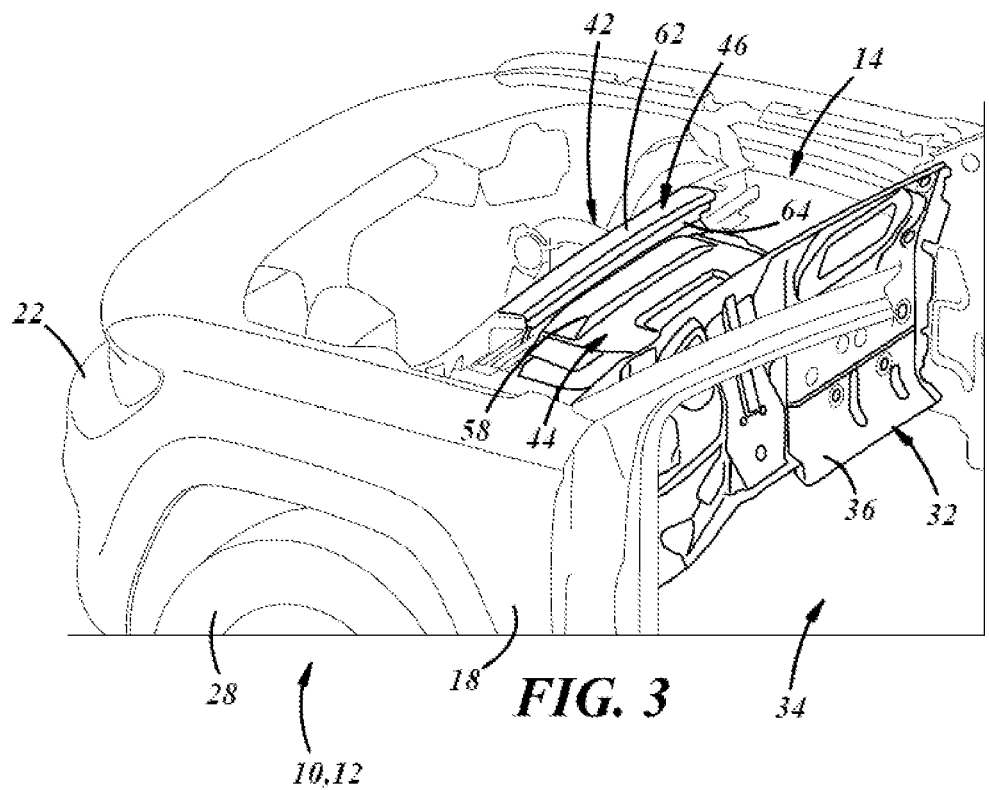
FIG. 3 is another perspective view of the front portion of the vehicle shown without the hood.
Figure 4:
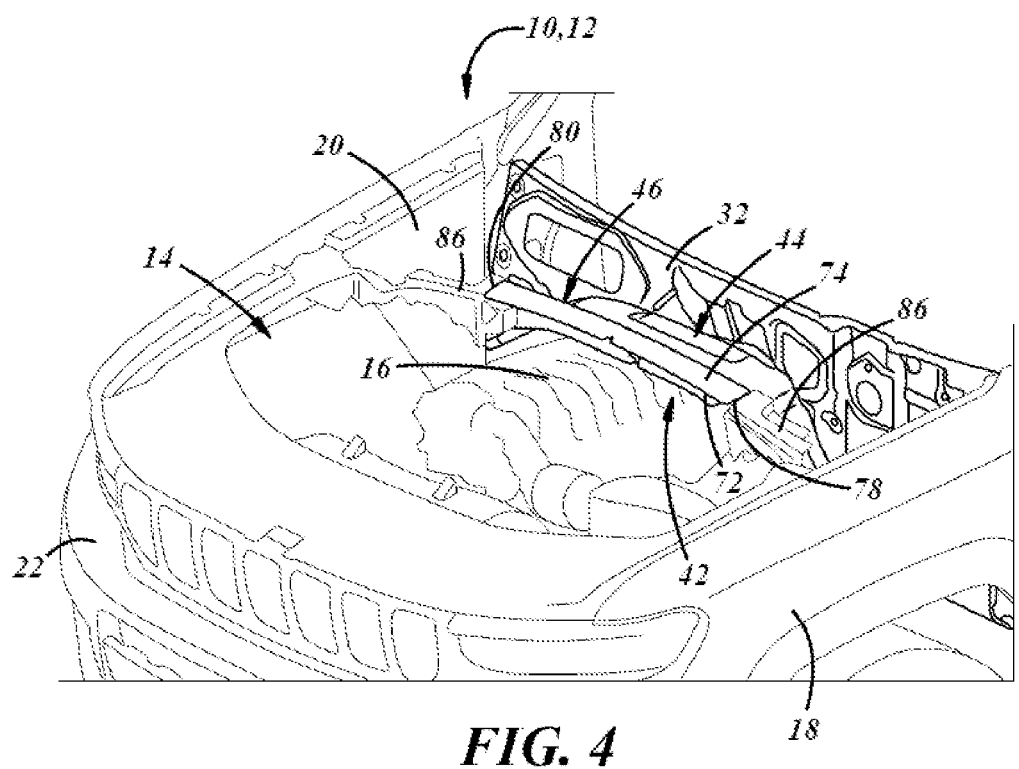
FIG. 4 is another perspective view of the front portion of the vehicle shown without the hood.

FIGS. 2-4 illustrate the vehicle front portion 10 with the hood 24 removed to expose components and structures within the front compartment 14. In the example shown, a combustion engine 16 is received within the front compartment 14 which sometimes is called an engine compartment. The engine 16 is mounted to the vehicle substructure which includes various structural members (beams, braces, brackets, etc) and is coupled to other components, like a transmission, coolant and oil systems, an alternator and the like. The hood 24 is received over these components and an inner surface 38 (FIGS. 6 and 7) of the hood 24 defines part of an interior of the front compartment 14 while an outer surface 40 (FIG. 1) of the hood 24 defines part of the vehicle exterior.

Figure 7:
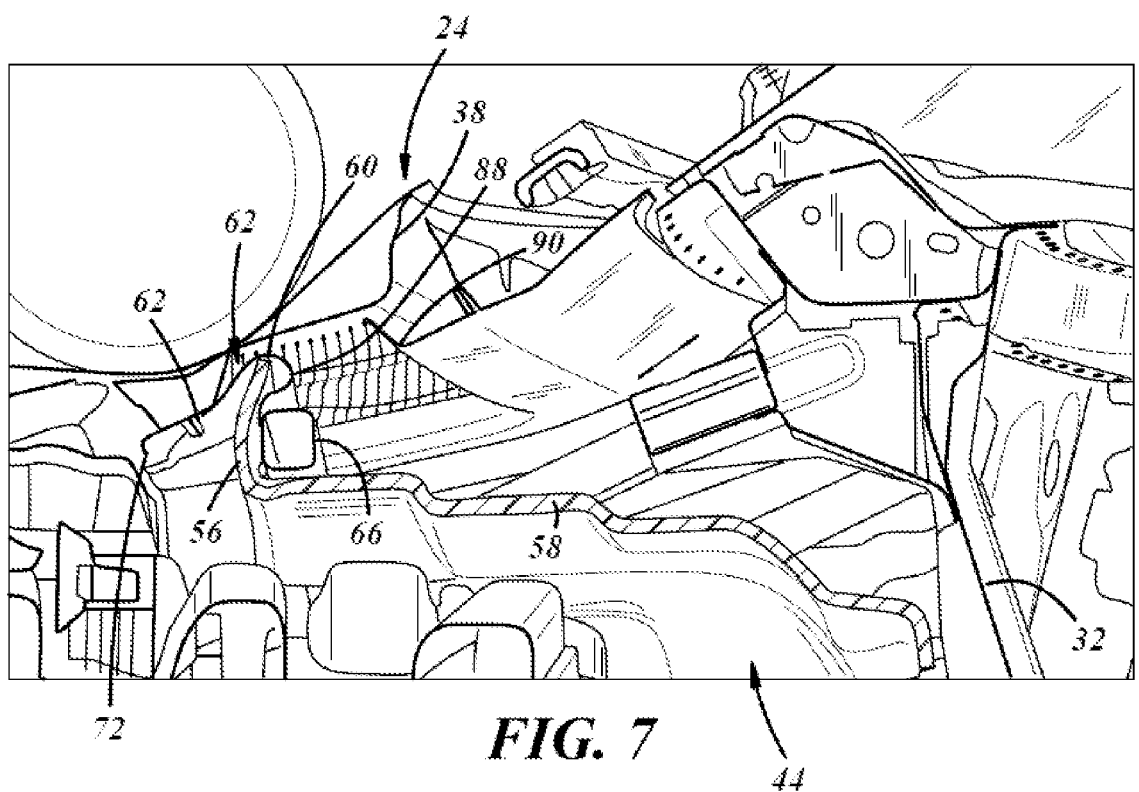
FIG. 7 is a view similar to FIG. 6 showing components after an object has impacted the hood.

An energy absorbing member 42 is received within the front compartment 14, at least partially between the engine 16 and the inner surface 38 of the hood 24. When the hood 24 is impacted in an area near the engine 16 and the hood 24 is flexed inwardly (e.g. as shown in FIG. 7), toward the engine 16, some of the energy is transferred from the hood 24 to the energy absorbing member 42. In at least some implementations, the energy absorbing member 42 has an engine cover 44 and an upper member 46 coupled to the engine cover 44.

Figure 5:
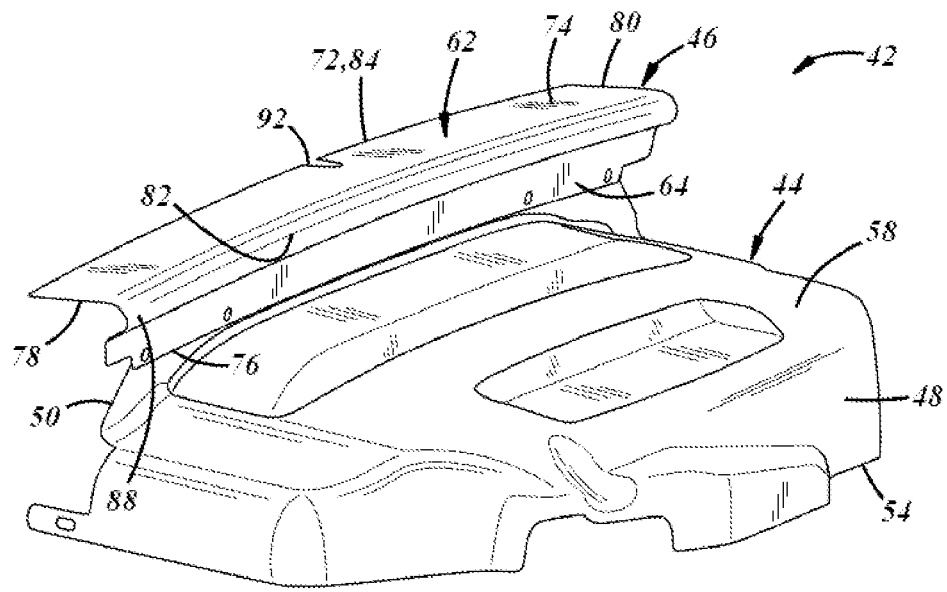
FIG. 5 is a perspective view of the energy absorbing member.
Figure 6:
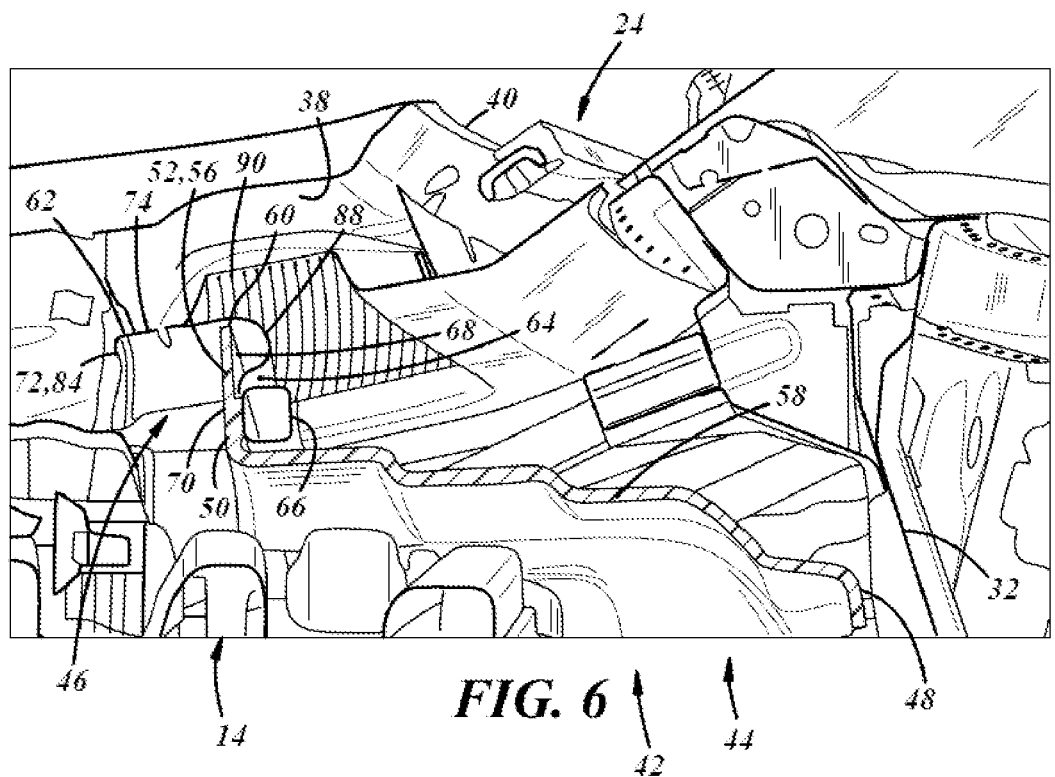
FIG. 6 is a sectional view showing a portion of the front compartment, part of the hood, the energy absorbing member and adjacent components within the front compartment.

In at least some implementations, the engine cover 44 overlies at least part of the engine 16 and/or is received partially between the engine 16 and the dividing wall 32. As shown in FIGS. 5 and 6, the engine cover 44 has a length in the fore-aft direction from a rear end 48 which may be connected to the dividing wall 32, such as by mechanical fasteners, to a front end 50 that may overlap in the fore-aft direction part of the engine 16 (i.e. be vertically between the hood 24 and at least part of the engine 16). The engine cover 44 has a width in the cross-car direction that is at least as great as a majority of the cross-car width of the engine 16 and which may be greater than the cross-car width of the engine 16. And the engine cover 44 may have a height in the vertical direction between an upper end 52 (FIG. 6) and a lower end 54 (FIG. 5), and may overlap at least part of the engine 16 in the vertical direction. So arranged, the engine cover 44 may provide a heat and noise barrier between the engine 16 and the passenger compartment 34. Further, the engine cover 44 may support, at least in part, other components within the front compartment 14, if desired. In the example shown, the engine cover 44 includes a flange 56 that includes or defines at least part of the upper end 52, and which extends vertically from a main body 58 of the engine cover 44 to an upper edge 60 (FIG. 6), away from the engine 16 and toward the hood 24. The flange 56 is oriented in the vertical direction or within 20 degrees of the vertical direction.

The upper member 46 has a first portion 62 and a base 64, and the base 64 is connected to the engine cover 44, such as to the flange 56. The base 64 may extend parallel to the flange 56 (or other part of the engine cover 44) in the cross-car and vertical directions and, and may be coupled to the flange 56 at several locations in any desired manner, such as by fasteners, welds, or adhesive. The base 64 may extend along at least a majority of the width of the engine cover 44, and may have a width that is equal to or greater than the engine cover 44, if desired. Also if desired, as shown in FIG. 6, a reinforcing member 66 may be provided at the base 64, and connected to the base 64 and engine cover 44, such as to the flange 56 in any desired manner (fasteners, weld, adhesive, etc). The reinforcing member 66 may be tubular and may assist in maintaining a connection of the base 64 to the engine cover 44. The base 64 may be connected to a rear surface 68 of the flange 56, where rear denotes the surface facing away from the front of the vehicle, and toward the passenger compartment 34. The base 64 could instead be connected to the front surface 70 of the flange 56 and/or to the engine cover 44 separate from the flange 56.

As shown in FIGS. 6 and 7, the first portion 62 may extend at a non-zero and not parallel angle to the base 64, and an arcuate transition 88 may be provided between the base and first portion. In at least some implementations, the base 64 is arranged at an angle greater than 45 degrees from the first portion 62. The first portion 62 may extend from the base, over the flange 56, and may be spaced from the upper edge 60 of the flange 56 and the front surface 70 of the flange 56. So arranged, the first portion 62 is received above the upper end 52 of the engine cover 44 and extends in the fore-aft direction to a free end 72 such that the upper member 46 is cantilevered at its base 64 to the engine cover 44. The first portion 62, in at least some implementations, may be parallel to the inner surface 38 of the hood 24 or within 20 degrees of parallel to the inner surface 38 of the hood 24. As shown in FIG. 5, for example, a vertical height of the upper member 46 is defined between an upper surface 74 closest to the hood 24 and a lower edge 76 of the base 64, a cross-car width is defined between opposite sides 78, 80, and a fore-aft length is defined between a rear side 82 and a front side 84 at or defined by the free end 72 of the upper member 46. The first portion 62 of the upper member 46 extends along at least a majority of the width of the engine cover 44, and may have a width that is greater than the engine cover 44, if desired. The upper member 46 may be coupled to one or more supports 86 extending inwardly from a side of the front compartment 14, such as is shown in FIGS. 3 and 4, in which both sides 78, 80 of the first portion 62 of the upper member 46 are connected to spaced apart supports 86, with the first portion 62 overlying at least part of the supports 86 (e.g. received between such part and the hood 24). The portion of the supports 86 to which the upper member is coupled may be formed from a foam or other material that may yield, flex or break as the upper member is deformed during an impact, to permit bending of the upper member 46. The remainder of the support may be a plastic, metal or some combination of a desired material. In at least some implementations, a center portion of the first portion 62, between the sides 78, 80 and supports 86, is not connected to any other structure.

The upper member 46 may be formed from sheet metal, like steel or aluminum or other material that permits some flexing of at least part of the first portion 62 relative to the base 64 and engine cover 44. To provide a desired flexibility of the first portion 62, the material of the upper member 46 may, for example, be aluminum with a Young's modulus between 100 MPa and 140 MPa, and a tensile strength of 280 MPa to 320 MPa, and may be between 0.8 mm and 1.2 mm thick, or the upper member 46 could be formed from a mild steel having tensile strength of about 25 ksi and a thickness between 0.6 mm and 1.2 mm. Again, these are examples and not intended to be limiting.

A gap may be provided between the upper member 46 and the upper edge 60 of the engine cover 44, with the front 84 of the upper member 46 being spaced in the fore-aft direction from the upper edge 60. The gap may be sized so that after some amount of flexing of the first portion 62, the upper member 46 may engage the upper edge 60 of the engine cover 44 and then flex or bend around the upper edge 60. This may provide an initial flexing of the first portion 62 that occurs with less resistance until the upper edge 60 is engaged at which point additional flexing of the upper portion is resisted by the engine cover 44, which stiffens the upper member 46 somewhat for additional energy absorption. Further, the transition portion 88 between the base 64 and first portion 62 of the upper member 46 may be arcuate or rounded, with a radius of between 8 mm and 12 mm at the ends of the upper member 46 and between 12 mm and 18 mm at the center of the upper member. Of course, the radius may be the same along the length of the upper member, if desired. Further, in at least some implementations, the first portion 62 has a width between 40 mm and 70 mm. The radiused transition portion 88 provides a desired spring rate for the upper member 46 and may facilitate the base 64 also flexing, for example away from the flange 56, upon impact of an object with the upper member 46, like the hood 24 or a cowl cover 90 (FIGS. 2, 6 and 7) received between the hood 24 and upper member 46. Further, the upper member 46 may include one or more cutouts 92 (FIG. 5) in the first portion 62, which may extend from and be open to the free end 72. The cutout(s) 92 may provide a desired strength and spring rate of the upper member 46 to facilitate flexing of and energy absorption by the upper member 46 in a desired manner.

As shown in FIGS. 2, 6 and 7, the cowl cover 90 may be located between the hood 24 and the upper member 46, may partially or completely overlap the upper member 46 in the fore-aft direction, and may extend in the cross-car direction between a first end 94 (FIG. 2) coupled to one side of the front compartment 14 and a second end 96 (FIG. 2) coupled to the opposite side of the front compartment 14. Further, between its ends 94, 96, the cowl cover 90 may be connected to the first portion 62 of the upper member 46, as shown in FIG. 6, such as by one or more snap-fit, interlocking or interference fit connectors, as desired. A rear side 98 of the cowl cover 90 may be arranged adjacent to a lower edge of a windshield 30, and may catch leaves and other debris that falls into a gap between a rear edge 100 (FIG. 1) of the hood 24 and the windshield 30.

As shown in FIG. 7, when impacted by an object, such as a pedestrian, the hood 24 flexes inwardly and an inner surface 38 of the hood 24 engages the cowl cover 90, which itself flexes and which flexes the first portion 62 of the upper member 46. The flange 56 of the engine cover 44 may also flex forward or backward as the first portion 62 is flexed downwardly into engagement with the upper edge 60 of the flange 56. Thus, significant flexing of relatively thin pieces of metal or plastic (the engine cover and cowl cover may be formed of any desired materials, including metal, plastics or composite materials) occurs prior to the flexing being stopped by engagement with a more fixed or more rigid structures, like a component fixed to the vehicle substructure or the engine 16. In this way, significant energy of the impact is absorbed by controlled flexing of these components to reduce impact energy returned to the object that struck the hood 24.

What is claimed is:

1. An energy absorbing member for a vehicle, comprising:
an engine cover adapted to be mounted beneath an inner surface of and separately from a vehicle hood and to overlie at least part of an engine; and
an upper member coupled to the engine cover, the upper member being cantilevered to the engine cover wherein the upper member has a base coupled to the engine cover and a free end spaced from the base, the upper member is flexible and a first portion of the upper member spaced from the base and including the free end is movable relative to the base.

2. The member of claim 1, wherein the base is arranged at an angle greater than 45 degrees from the first portion.

3. The member of claim 2 wherein the engine cover includes a main body that is adapted to overlie at least part of the engine, and the engine cover has a flange extending from the main body, and wherein the base is connected to the flange and the flange extends from the main body toward the inner surface of the hood, and wherein the flange has an upper edge that is closer to the first portion than is the area at which the base is connected to the flange.

4. The member of claim 3 which includes a reinforcing member extending along the base and coupled to the base and the flange of the engine cover.

5. The member of claim 2 wherein the upper member includes an arcuate transition between the base and the first portion.

6. The member of claim 5 wherein the upper member is not coupled to the engine cover at the transition.

7. The member of claim 1 which also includes a cowl cover connected to the first portion of the upper member.

8. The member of claim 1 wherein the first portion is formed of metal having a thickness between 0.6 mm and 1.2 mm.

9. The member of claim 1 wherein the upper member is defined by aluminum having a yield strength between 100 MPa and 140 MPa, and a tensile strength of between 280 MPa and 320 MPa.

10. A vehicle, comprising:
a hood covering at least part of a front compartment, wherein the front compartment is separate from a passenger compartment of the vehicle and wherein the hood has an inner surface defining a boundary of the front compartment;
an engine cover mounted beneath the hood and within the front compartment, adapted to overlie at least part of an engine within the front compartment and to be received at least partially between the engine and the passenger compartment; and
an upper member within the front compartment and coupled to the engine cover, the upper member being cantilevered to the engine cover wherein the upper member has a base coupled to the engine cover and a free end spaced from the engine, and the upper member has a portion received between the engine and the inner surface of the hood such that upon flexing of the hood toward the engine, the hood engages the upper member before the hood engages the engine.

11. The vehicle of claim 10 wherein the upper member has a first portion that includes the free end and that is parallel to the inner surface of the hood or within 20 degrees of parallel to the inner surface of the hood, and wherein the base is arranged at an angle greater than 45 degrees from the first portion.

12. The vehicle of claim 11 wherein the engine cover includes a main body that is adapted to overlie at least part of the engine, and the engine cover has a flange extending from the main body, and wherein the base is connected to the flange and the flange extends from the main body toward the inner surface of the hood, and wherein the flange has an edge that is closer to the first portion than is the area at which the base is connected to the flange.

13. The vehicle of claim 11 wherein the upper member includes an arcuate transition between the base and the first portion.

14. The vehicle of claim 10 which also includes a cowl cover located at least partially between the engine and the hood, the cowl cover extends in a cross-car direction across at least a majority of the engine compartment, and wherein the cowl cover is connected to the upper member.

* * * * *